US009111325B2

(12) United States Patent  
Diard

(10) Patent No.: US 9,111,325 B2  
(45) Date of Patent: Aug. 18, 2015

(54) SHARED BUFFER TECHNIQUES FOR HETEROGENEOUS HYBRID GRAPHICS

(75) Inventor: Franck Diard, Mountain View, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 1259 days.

(21) Appl. No.: 12/651,395

(22) Filed: Dec. 31, 2009

(65) Prior Publication Data

US 2011/0157189 A1 Jun. 30, 2011

(51) Int. Cl.  
G06F 15/16 (2006.01)  
G06T 1/00 (2006.01)

(52) U.S. Cl.  
CPC ........................ G06T 1/00 (2013.01)

(58) Field of Classification Search  
USPC ............................ 710/314; 345/501; 719/327  
See application file for complete search history.

(56) References Cited

U.S. PATENT DOCUMENTS

| 4,603,400 A | 7/1986 | Daniels |
| 4,955,066 A | 9/1990 | Notenboom |
| 5,016,001 A | 5/1991 | Minagawa et al. |
| 5,321,510 A | 6/1994 | Childers et al. |
| 5,371,847 A | 12/1994 | Hargrove |
| 5,461,679 A | 10/1995 | Normile et al. |
| 5,517,612 A | 5/1996 | Dwin et al. |
| 5,572,649 A | 11/1996 | Elliott et al. |
| 5,687,334 A | 11/1997 | Davis et al. |
| 5,712,995 A | 1/1998 | Cohn |
| 5,768,164 A | 6/1998 | Hollon, Jr. |
| 5,781,199 A | 7/1998 | Oniki et al. |
| 5,841,435 A | 11/1998 | Dauerer et al. |
| 5,878,264 A | 3/1999 | Ebrahim |
| 5,900,913 A | 5/1999 | Tults |
| 5,917,502 A | 6/1999 | Kirkland et al. |
| 5,923,307 A | 7/1999 | Hogle, IV |
| 5,953,532 A | 9/1999 | Lochbaum |
| 5,978,042 A | 11/1999 | Vaske et al. |
| 6,008,809 A | 12/1999 | Brooks |
| 6,018,340 A | 1/2000 | Butler et al. |
| 6,025,841 A | 2/2000 | Finkelstein et al. |
| 6,025,853 A | 2/2000 | Baldwin |
| 6,075,531 A | 6/2000 | DeStefano |
| 6,078,339 A | 6/2000 | Meinerth et al. |
| 6,191,758 B1 | 2/2001 | Lee |

(Continued)

FOREIGN PATENT DOCUMENTS

WO 2005026918 3/2005

OTHER PUBLICATIONS

"Epson; EMP Monitor V4, 10 Operation Guide", by Seiko Epson Corp., 2006 http://support.epsonsu/products/manuals/100396/Manual/EMPMonitor.pdf.

(Continued)

Primary Examiner — Phi Hoang

(57) ABSTRACT

The graphics processing technique includes detecting a transition from rendering graphics on a first graphics processing unit to a second graphics processing, by a hybrid driver. The hybrid driver, in response to detecting the transition, configures the first graphics processing unit to create a frame buffer. Thereafter, an image rendered on the second graphics processing unit may be copied to the frame buffer of the first graphics processing unit. The rendered image in the frame buffer may then be scanned out on the display.

16 Claims, 4 Drawing Sheets

(56) References Cited

U.S. PATENT DOCUMENTS

| | | |
|---|---|---|
| 6,208,273 B1 | 3/2001 | Dye et al. |
| 6,226,237 B1 | 5/2001 | Chan et al. |
| 6,259,460 B1 | 7/2001 | Gossett et al. |
| 6,337,747 B1 | 1/2002 | Rosenthal |
| 6,359,624 B1 | 3/2002 | Kunimatsu |
| 6,388,671 B1 | 5/2002 | Yoshizawa et al. |
| 6,407,752 B1 | 6/2002 | Harnett |
| 6,473,086 B1 | 10/2002 | Morein et al. |
| 6,480,198 B2 | 11/2002 | Kang |
| 6,483,502 B2 | 11/2002 | Fujiwara |
| 6,483,515 B1 | 11/2002 | Hanko |
| 6,498,721 B1 | 12/2002 | Kim |
| 6,557,065 B1 | 4/2003 | Peleg et al. |
| 6,600,500 B1 | 7/2003 | Yamamoto |
| 6,628,243 B1 | 9/2003 | Lyons et al. |
| 6,628,309 B1 | 9/2003 | Dodson et al. |
| 6,630,943 B1 | 10/2003 | Nason et al. |
| 6,654,826 B1 | 11/2003 | Cho et al. |
| 6,657,632 B2 | 12/2003 | Emmot et al. |
| 6,724,403 B1 | 4/2004 | Santoro et al. |
| 6,753,878 B1 | 6/2004 | Heirich et al. |
| 6,774,912 B1 | 8/2004 | Ahmed et al. |
| 6,784,855 B2 | 8/2004 | Matthews et al. |
| 6,816,977 B2 | 11/2004 | Brakmo et al. |
| 6,832,269 B2 | 12/2004 | Huang et al. |
| 6,832,355 B1 | 12/2004 | Duperrouzel et al. |
| 6,871,348 B1 | 3/2005 | Cooper |
| 6,956,542 B2 | 10/2005 | Okuley et al. |
| 7,007,070 B1 | 2/2006 | Hickman |
| 7,010,755 B2 | 3/2006 | Anderson et al. |
| 7,030,837 B1 | 4/2006 | Vong et al. |
| 7,034,776 B1 | 4/2006 | Love |
| 7,036,089 B2 | 4/2006 | Bauer |
| 7,103,850 B1 | 9/2006 | Engstrom et al. |
| 7,124,360 B1 | 10/2006 | Drenttel et al. |
| 7,127,745 B1 | 10/2006 | Herse et al. |
| 7,129,909 B1 | 10/2006 | Dong et al. |
| 7,149,982 B1 | 12/2006 | Duperrouzel et al. |
| 7,212,174 B2 | 5/2007 | Johnston et al. |
| 7,269,797 B1 | 9/2007 | Bertocci et al. |
| 7,359,998 B2 | 4/2008 | Chan et al. |
| 7,486,279 B2 | 2/2009 | Wong et al. |
| 7,509,444 B2 | 3/2009 | Chiu et al. |
| 7,546,546 B2 | 6/2009 | Lewis-Bowen et al. |
| 7,552,391 B2 | 6/2009 | Evans et al. |
| 7,558,884 B2 | 7/2009 | Fuller et al. |
| 7,590,713 B2 | 9/2009 | Brockway et al. |
| 7,612,783 B2 | 11/2009 | Koduri et al. |
| 7,783,985 B2 | 8/2010 | Indiran et al. |
| 8,176,155 B2 | 5/2012 | Yang et al. |
| 8,190,707 B2 | 5/2012 | Trivedi et al. |
| 8,736,617 B2 | 5/2014 | Lew et al. |
| 2001/0028366 A1 | 10/2001 | Ohki et al. |
| 2002/0054141 A1 | 5/2002 | Yen et al. |
| 2002/0057295 A1 | 5/2002 | Panasyuk et al. |
| 2002/0087225 A1 | 7/2002 | Howard |
| 2002/0128288 A1 | 9/2002 | Kyle et al. |
| 2002/0129288 A1 | 9/2002 | Loh et al. |
| 2002/0140627 A1 | 10/2002 | Ohki et al. |
| 2002/0163513 A1 | 11/2002 | Tsuji |
| 2002/0175933 A1 | 11/2002 | Ronkainen et al. |
| 2002/0182980 A1 | 12/2002 | Van Rompay |
| 2002/0186257 A1 | 12/2002 | Cadiz et al. |
| 2002/0196279 A1 | 12/2002 | Bloomfield et al. |
| 2003/0016205 A1 | 1/2003 | Kawabata et al. |
| 2003/0025689 A1 | 2/2003 | Kim |
| 2003/0041206 A1 | 2/2003 | Dickie |
| 2003/0065934 A1 | 4/2003 | Angelo et al. |
| 2003/0088800 A1 | 5/2003 | Cai |
| 2003/0090508 A1 | 5/2003 | Keohane et al. |
| 2003/0105812 A1 | 6/2003 | Flowers, Jr. et al. |
| 2003/0126335 A1 | 7/2003 | Silvester |
| 2003/0160816 A1 | 8/2003 | Zoller et al. |
| 2003/0177172 A1 | 9/2003 | Duursma et al. |
| 2003/0179240 A1 | 9/2003 | Gest |
| 2003/0179244 A1 | 9/2003 | Erlingsson |
| 2003/0188144 A1 | 10/2003 | Du et al. |
| 2003/0189597 A1 | 10/2003 | Anderson et al. |
| 2003/0195950 A1 | 10/2003 | Huang et al. |
| 2003/0197739 A1 | 10/2003 | Bauer |
| 2003/0200435 A1 | 10/2003 | England et al. |
| 2003/0208529 A1 | 11/2003 | Pendyala et al. |
| 2003/0222876 A1 | 12/2003 | Giemborek et al. |
| 2003/0222915 A1 | 12/2003 | Marion et al. |
| 2003/0225872 A1 | 12/2003 | Bartek et al. |
| 2003/0229900 A1 | 12/2003 | Reisman |
| 2004/0001069 A1 | 1/2004 | Snyder et al. |
| 2004/0019724 A1 | 1/2004 | Singleton, Jr. et al. |
| 2004/0027315 A1 | 2/2004 | Senda et al. |
| 2004/0066414 A1 | 4/2004 | Czerwinski et al. |
| 2004/0070608 A1 | 4/2004 | Saka |
| 2004/0080482 A1 | 4/2004 | Magendanz et al. |
| 2004/0085328 A1 | 5/2004 | Maruyama et al. |
| 2004/0095382 A1 | 5/2004 | Fisher et al. |
| 2004/0145605 A1 | 7/2004 | Basu et al. |
| 2004/0153493 A1 | 8/2004 | Slavin et al. |
| 2004/0184523 A1 | 9/2004 | Dawson et al. |
| 2004/0222978 A1 | 11/2004 | Bear et al. |
| 2004/0224638 A1 | 11/2004 | Fadell et al. |
| 2004/0225901 A1 | 11/2004 | Bear et al. |
| 2004/0225907 A1 | 11/2004 | Jain et al. |
| 2004/0235532 A1 | 11/2004 | Matthews et al. |
| 2004/0260565 A1 | 12/2004 | Zimniewicz et al. |
| 2004/0268004 A1 | 12/2004 | Oakley |
| 2005/0025071 A1 | 2/2005 | Miyake et al. |
| 2005/0059346 A1 | 3/2005 | Gupta et al. |
| 2005/0064911 A1 | 3/2005 | Chen et al. |
| 2005/0066209 A1 | 3/2005 | Kee et al. |
| 2005/0073515 A1 | 4/2005 | Kee et al. |
| 2005/0076088 A1 | 4/2005 | Kee et al. |
| 2005/0076256 A1 | 4/2005 | Fleck et al. |
| 2005/0091610 A1 | 4/2005 | Frei et al. |
| 2005/0097506 A1 | 5/2005 | Heumesser |
| 2005/0125739 A1 | 6/2005 | Thompson et al. |
| 2005/0132299 A1 | 6/2005 | Jones et al. |
| 2005/0140566 A1 | 6/2005 | Kim et al. |
| 2005/0168472 A1* | 8/2005 | Gosalia et al. ............... 345/543 |
| 2005/0182980 A1 | 8/2005 | Sutardja |
| 2005/0240538 A1 | 10/2005 | Ranganathan |
| 2005/0240873 A1 | 10/2005 | Czerwinski et al. |
| 2005/0262302 A1 | 11/2005 | Fuller et al. |
| 2005/0268246 A1 | 12/2005 | Keohane et al. |
| 2006/0001595 A1 | 1/2006 | Aoki |
| 2006/0007051 A1 | 1/2006 | Bear et al. |
| 2006/0085760 A1 | 4/2006 | Anderson et al. |
| 2006/0095617 A1 | 5/2006 | Hung |
| 2006/0119537 A1 | 6/2006 | Vong et al. |
| 2006/0119538 A1 | 6/2006 | Vong et al. |
| 2006/0119602 A1 | 6/2006 | Fisher et al. |
| 2006/0125784 A1 | 6/2006 | Jang et al. |
| 2006/0129855 A1 | 6/2006 | Rhoten et al. |
| 2006/0130075 A1 | 6/2006 | Rhoten et al. |
| 2006/0142878 A1 | 6/2006 | Banik et al. |
| 2006/0150230 A1 | 7/2006 | Chung et al. |
| 2006/0164324 A1 | 7/2006 | Polivy et al. |
| 2006/0232494 A1 | 10/2006 | Lund et al. |
| 2006/0250320 A1 | 11/2006 | Fuller et al. |
| 2006/0267857 A1 | 11/2006 | Zhang et al. |
| 2006/0267987 A1 | 11/2006 | Litchmanov |
| 2006/0267992 A1 | 11/2006 | Kelley et al. |
| 2006/0282604 A1* | 12/2006 | Temkine et al. ............... 710/314 |
| 2006/0282855 A1 | 12/2006 | Margulis |
| 2007/0046562 A1 | 3/2007 | Polivy et al. |
| 2007/0050727 A1 | 3/2007 | Lewis-Bowen et al. |
| 2007/0052615 A1 | 3/2007 | Van Dongen et al. |
| 2007/0067655 A1 | 3/2007 | Shuster |
| 2007/0079030 A1 | 4/2007 | Okuley et al. |
| 2007/0083785 A1 | 4/2007 | Sutardja |
| 2007/0103383 A1 | 5/2007 | Sposato et al. |
| 2007/0195007 A1 | 8/2007 | Bear et al. |
| 2007/0195099 A1* | 8/2007 | Diard et al. .................. 345/501 |
| 2007/0273699 A1 | 11/2007 | Sasaki et al. |
| 2008/0034318 A1 | 2/2008 | Louch et al. |
| 2008/0130543 A1 | 6/2008 | Singh et al. |

(56) References Cited

U.S. PATENT DOCUMENTS

| | | | |
|---|---|---|---|
| 2008/0155478 | A1 | 6/2008 | Stross |
| 2008/0172626 | A1 | 7/2008 | Wu |
| 2008/0297433 | A1 | 12/2008 | Heller et al. |
| 2008/0303846 | A1* | 12/2008 | Brichter et al. ............... 345/661 |
| 2008/0320321 | A1 | 12/2008 | Sutardja |
| 2009/0021450 | A1 | 1/2009 | Heller et al. |
| 2009/0031329 | A1 | 1/2009 | Kim |
| 2009/0059496 | A1 | 3/2009 | Lee |
| 2009/0160865 | A1 | 6/2009 | Grossman |
| 2009/0167785 | A1* | 7/2009 | Wong ........................... 345/629 |
| 2009/0172450 | A1 | 7/2009 | Wong et al. |
| 2009/0172707 | A1* | 7/2009 | Huang et al. ................. 719/327 |
| 2009/0193243 | A1 | 7/2009 | Ely |
| 2010/0010653 | A1 | 1/2010 | Bear et al. |
| 2010/0033433 | A1 | 2/2010 | Utz et al. |
| 2010/0033916 | A1 | 2/2010 | Douglas et al. |
| 2010/0169666 | A1* | 7/2010 | Dewan et al. ................. 713/190 |
| 2010/0207957 | A1* | 8/2010 | Taneja et al. ................. 345/592 |
| 2011/0219313 | A1 | 9/2011 | Mazzaferri |

OTHER PUBLICATIONS

"Virtual Network Computing, http://en.wikipedia.org/wikiVnc", Downloaded Circa: Dec. 18, 2008, pp. 1-4.

Andrew Fuller; "Auxiliary Display Platform in Longhorn"; Microsoft Corporation; The Microsoft Hardware Engineering Conference Apr. 25-27, 2005; slides 1-29.

McFedries, ebook, titled "Complete Idiot's Guide to Windows XP", published Oct. 3, 2001, pp. 1-7.

PCWorld.com, "Microsoft Pitches Display for Laptop Lids" dated Feb. 10, 2005, pp. 1-2, downloaded from the Internet on Mar. 8, 2006 from http://www.pcworld.com/resources/article/aid/119644.asp.

Vulcan, Inc., "Product Features: Size and performance", p. 1; downloaded from the internet on Sep. 20, 2005 from http://www.flipstartpc.com/aboutproduct_features_sizeandpower.asp.

Vulcan, Inc., "Product Features:LID Module", p. 1, downloaded from the Internet on Sep. 19, 2005 from http://www.flipstartpc.com/aboutproduct_features_lidmodule.asp.

Vulcan, Inc., "Software FAQ", p. 1, downloaded from the internet on Sep. 20, 2005 from http://www.flipstartpc.com/faq_software.asp.

"System Management Bus (SMBus) Specification," Version 2.0, Aug. 3, 2000; pp. 1-59.

Handtops.com, "FlipStart PC in Detail" pp. 1-4, downloaded from the internet o Sep. 20, 2005 from http://www.handtops.com/show/news/5.

Microsoft Corporation, "Microsoft Windows Hardware Showcase", dated Apr. 28, 2005; pp. 1-5; downloaded from the internet on Sep. 15, 2005, from http://www.microsoft.com/whdc/winhec/hwshowcase05.mspx.

Paul Thurrot's SuperSite for Windows, "WinHEC 2004 Longhom Prototypes Gallery", dated May 10, 2004, pp. 1-4, downloaded from the internet on Sep. 15, 2005 from http://www.sinwupersite.com/showcase. loghom_winhc_proto.asp.

Vulcan, Inc., "Product Features:LID Module", p. 1, downloaded from the Internet on Sep. 19, 2005 from http://www.flipstartpc.com/aboutproductfeatures_lidmodule_asp.

"Usage: NVIDIA GeForce 6800—PCIe x16", Dell, archived Jan. 15, 2006 by archive.org, Downloaded Jun. 29, 2011, http://web.archive.org/web/20060115050119/http://support.dell.com/support/edocs/video/P82192/en/usage.htm.

"Graphics: Intel® 82852/82855 Graphics Controller Family", Intel, Archived Nov. 2, 2006 by archive.org, Downloaded Jun. 30, 2011, http://web.archive.org/web/20061103045644/http://www.intel.com/support/graphics/intel852gm/sb/CS-009064.htm?.

"The Java Tutorial: How to Use Combo Boxes", Archived Mar. 5, 2006 by archive.org, Downloaded Jun. 30, 2011, http://web.archive.org/web/20050305000852/http://www-mips.unice.fr/Doc/Java/Tutorial/uiswing/components/combobox.html.

* cited by examiner

SHARED BUFFER TECHNIQUES FOR HETEROGENEOUS HYBRID GRAPHICS

BACKGROUND OF THE INVENTION

Conventional computing systems may include a discrete graphics processing unit (dGPU) or an integral graphics processing unit (iGPU). The discrete GPU and integral GPU are heterogeneous because of their different designs. The integrated GPU generally has relatively poor processing performance compared to the discrete GPU. However, the integrated GPU generally consumes less power compared to the discrete GPU.

The conventional operating system does not readily support co-processing using such heterogeneous GPUs. Referring to FIG. 1, a graphics processing technique according to the conventional art is shown. When an application 110 starts, it calls the user mode level runtime application programming interface (e.g., DirectX API d3d9.dll) 120 to determine what display adapters are available. In response, the runtime API 120 enumerates the adapters that are attached to the desktop (e.g., the primary display 180). A display adapter 165, 175, even recognized and initialized by the operating system, will not be enumerated in the adapter list by the runtime API 120 if it is not attached to the desktop. The runtime API 120 loads the device driver interface (DDI) (e.g., user mode driver (umd.dll)) 130 for the GPU 170 attached to the primary display 180. The runtime API 120 of the operating system will not load the DDI of the discrete GPU 175 because the discrete GPU 175 is not attached to the display adapter. The DDI 130 configures command buffers of the graphics processor 170 attached to the primary display 180. The DDI 130 will then call back to the runtime API 120 when the command buffers have been configured.

Thereafter, the application 110 makes graphics request to the user mode level runtime API (e.g., DirectX API d3d9.dll) 120 of the operating system. The runtime 120 sends graphics requests to the DDI 130 which configures command buffers. The DDI calls to the operating system kernel mode driver (e.g., DirectX driver dxgkrnl.sys) 150, through the runtime API 120, to schedule the graphics request. The operating system kernel mode driver then calls to the device specific kernel mode driver (e.g., kmd.sys) 150 to set the command register of the GPU 170 attached to the primary display 180 to execute the graphics requests from the command buffers. The device specific kernel mode driver 160 controls the GPU 170 (e.g., integral GPU) attached to the primary display 180.

There is, however, a need to enable applications to render graphics on the discrete graphics processor and present the rendered graphics on a display attached to the integral graphics processor.

SUMMARY OF THE INVENTION

Embodiments of the present technology are directed toward shared buffer techniques for heterogeneous graphics. The present technology may best be understood by referring to the following description and accompanying drawings that are used to illustrate embodiment of the present technology.

In one embodiment, a graphics processing technique includes loading a device kernel mode driver agent, such as a wrapper driver, that includes a kernel mode device driver for a first graphics processing unit attached to a primary display and a kernel mode device driver for a second graphics processing unit. A call may be received by the device kernel mode driver agent from a service or user interface to transition from rendering graphics on the first graphics processing unit to the second graphics processing unit. In response to the transition call, the device kernel mode driver agent generates a call to configure the first graphics processing unit to create a surface in a frame buffer. In response to the call to create the surface, the device kernel mode driver agent receives a virtual address of the surface in the frame buffer of the first graphics processing unit. The device kernel mode driver agent determines and stores a physical address of the surface from the virtual address for use in transporting rendered data from the second graphics processing unit to the frame buffer of the first graphics processing unit attached to the primary display.

In another embodiment, a device kernel mode wrapper driver impersonates the operating system and sends a sequence of command to cause the GPU attached to the primary display to create a displayable surface and make it accessible to direct memory access (DMA) blits from a second GPU. The sequence of commands includes creating a shared primary surface, setting a mode with this created surface to show it on the primary display and mapping it through the bus coupling the second GPU to the GPU attached to the primary display. The surface that the wrapper driver causes the GPU attached to the primary display to create is DMA accessible to an external DMA engine, such as the copy engine of the second GPU. Upon successful setup of the shared surface, the second GPU can then display the frames that it computes on the primary display.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Figure 1:
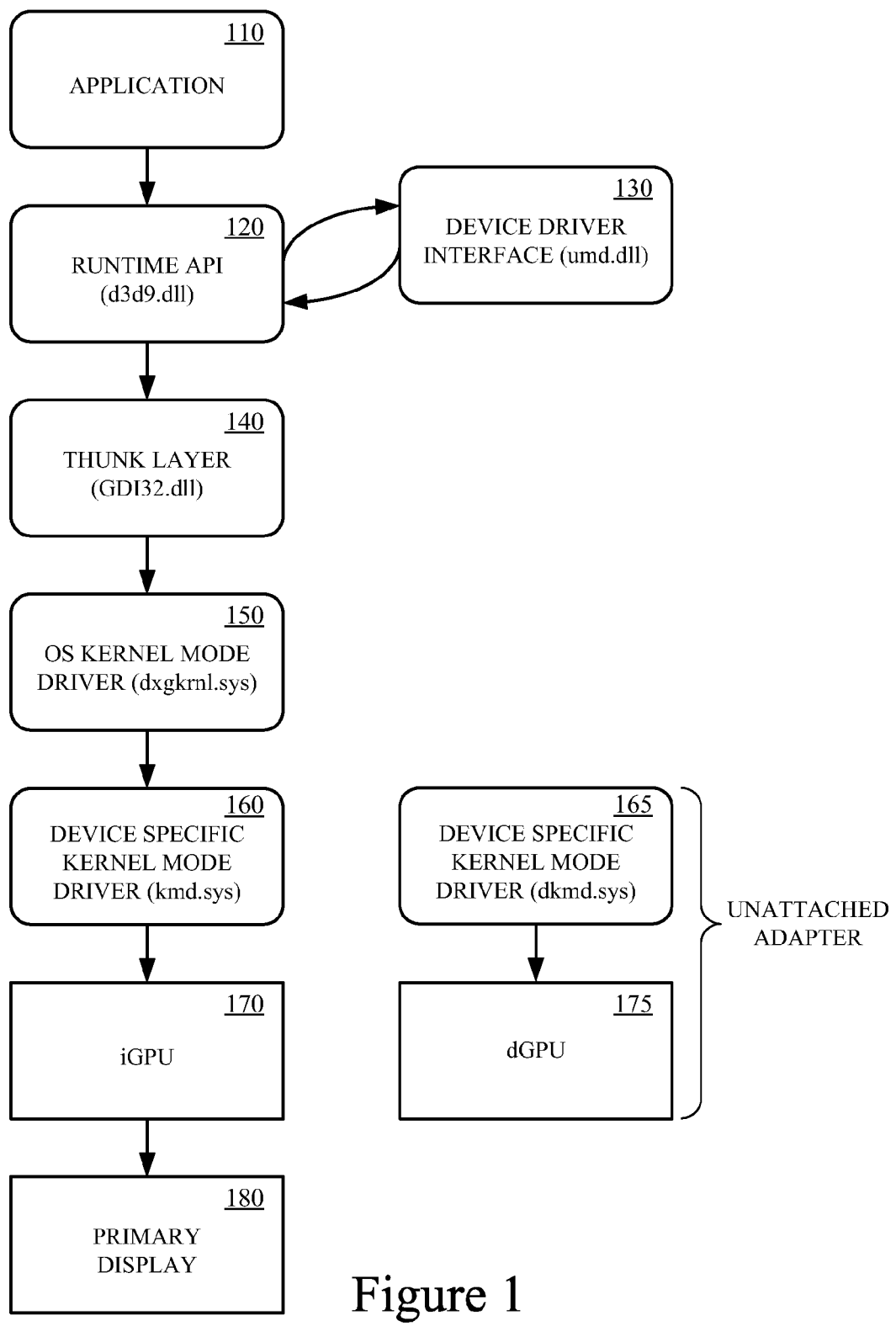
FIG. 1 shows a graphics processing technique according to the convention art.
Figure 2:
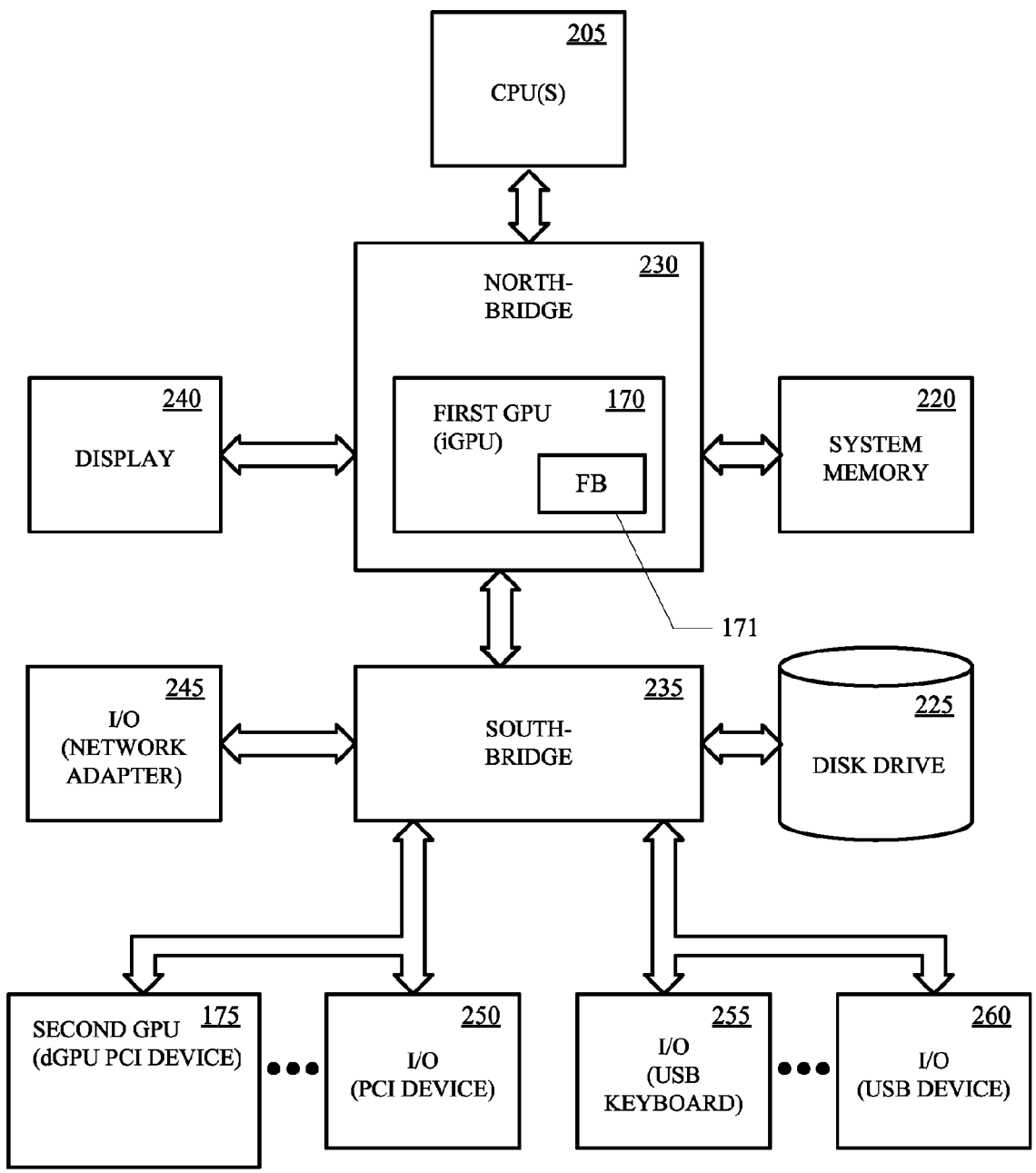
FIG. 2 shows a graphics co-processing computing platform, in accordance with one embodiment of the present technology.

Referring to FIG. 2, a graphics co-processing computing platform, in accordance with one embodiment of the present technology is shown. The exemplary computing platform may include one or more central processing units (CPUs) 205, a plurality of graphics processing units (GPUs) 170, 175, volatile and/or non-volatile memory (e.g., computer readable media) 220, 225, one or more chip sets 230, 235, and one or more peripheral devices 175, 240-260 communicatively coupled by one or more busses. The GPUs include heterogeneous designs. In one implementation, a first GPU may be an integral graphics processing unit (iGPU) and a second GPU may be a discrete graphics processing unit (dGPU). The chipset 230, 235 acts as a simple input/output hub for communicating data and instructions between the CPU 205, the GPUs 170, 175, the computing device-readable media 220, 225, and peripheral devices 175, 240-265. In one implementation, the chipset includes a northbridge 230 and southbridge 235. The northbridge 230 provides for communication between the CPU 205, system memory 220 and the southbridge 235. In one implementation, the northbridge 230 includes an integral GPU. The southbridge 235 provides for input/output functions. The peripheral devices 175, 240-265 may include a display device 240, a network adapter (e.g., Ethernet card) 245, CD drive, DVD drive, a keyboard, a pointing device, a speaker, a printer, and/or the like. In one implementation, the discrete graphics processing unit is coupled as a discrete GPU peripheral device 175 by a bus such as a Peripheral Component Interconnect Express (PCIe) bus.

The computing device-readable media 220, 225 may be characterized as primary memory and secondary memory. Generally, the secondary memory, such as a magnetic and/or optical storage, provides for non-volatile storage of computer-readable instructions and data for use by the computing device. For instance, the disk drive 225 may store the operating system (OS), applications and data. The primary memory, such as the system memory 220 and/or graphics memory, provides for volatile storage of computer-readable instructions and data for use by the computing device. For instance, the system memory 220 may temporarily store a portion of the operating system, a portion of one or more applications and associated data that are currently used by the CPU 205, GPU 170 and the like.

Figure 3A:
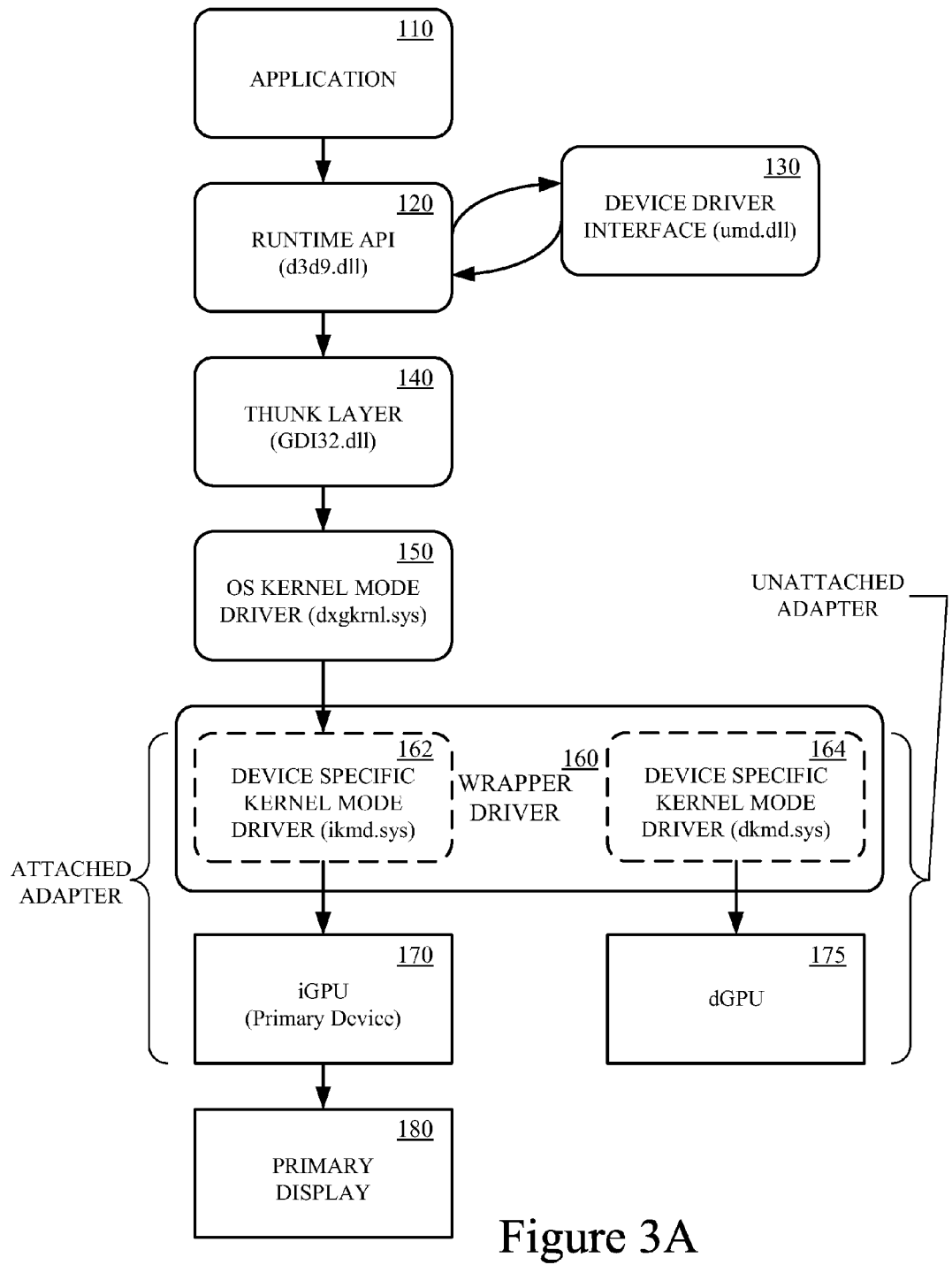
FIGS. 3A and 3B show a graphics co-processing technique, in accordance with one embodiment of the present technology.
Figure 3B:
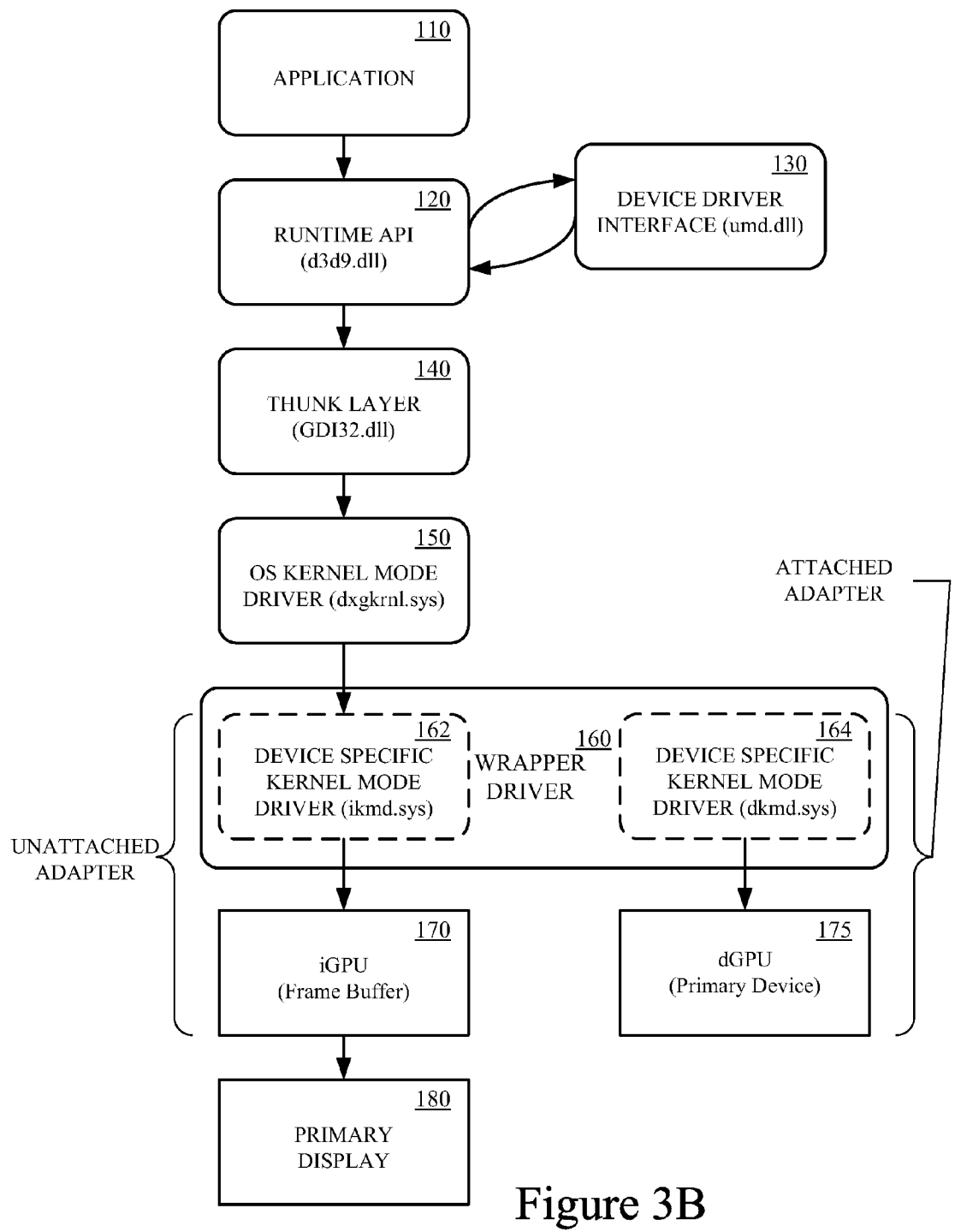

FIGS. 3A and 3B show a graphics processing technique, in accordance with one embodiment of the present technology. Referring now to FIG. 3A, when an application 110 starts, it calls the user mode level runtime application programming interface (e.g., DirectX API d3d9.dll) 120 to determine what display adapters are available. In response, the runtime API 120 enumerates the adapters that are attached to the desktop (e.g., the primary display 180). The runtime API 120 loads the device driver interface (DDI) (e.g., user mode drive (umd-.ddl)) 130 for the GPU 170 attached to the primary display 180. The DDI 130 configures command buffers of the graphics processor 170 attached to the primary display 180. The DDI 130 will then call back to the runtime API 120 when the command buffers have been configured.

In addition, during initialization of the system, one or more driver layers are loaded, including a thunk layer (e.g., GDI32.dll) 140, an operating system level kernel mode driver (e.g., dxgkrnal.sys) 150, a device kernel mode driver agent, and/or the like. In one implementation, the device kernel mode driver agent may be a kernel mode wrapper driver 160 that includes the binary images of the device specific kernel mode driver for the integral graphics processing unit 162 and the device specific kernel mode driver for the discrete graphics processing unit 164. The kernel mode wrapper driver 160 may also be referred to as a hybrid driver. Generally, the entry points into the kernel mode wrapper driver 160 are the same as the entry points for the device specific entry points.

Initially, the attached adapter includes the integral graphics processing unit 170 and its device specific kernel mode driver 162 because the integral graphics processing unit 170 is attached to the primary display 180. Thereafter, the device kernel mode driver agent 160 may detect a transition from rendering graphics on the integral graphics processing unit 170 to the discrete graphics processing unit 175. In one implementation, the discrete graphics processing unit 175 and its device specific kernel mode driver 164 are configured as the attached adapter and the integral graphics processing unit 170 and its device specific kernel mode driver 162 are detached, as illustrated in FIG. 3B. In one implementation, the transition is initiated by a service or user interface calling a given entry point of a local function in the wrapper driver 160.

In response to the transition, the device kernel mode driver agent 160 configures the integral graphics processing unit 170 to create a frame buffer 171 and to scan out from the frame buffer to the attached display 180. In one implementation, the kernel mode wrapper driver 160 receives a call to create a surface in a frame buffer 171 for the discrete graphics processing unit. The call to create the surface in the frame buffer 171 for the discrete graphics processing unit is redirected as a call to create the surface in a frame buffer for the integral graphics processing unit 170. In response to the redirected call to create the surface, the kernel mode wrapper driver 160 receives from the device specific kernel mode driver 162 a virtual address of the surface in the frame buffer 171 of the integral graphics processing unit 170. The kernel mode wrapper driver 160 determines a physical address from the virtual address of the surface. The kernel mode wrapper driver stores the physical address for use in transporting rendered data from the discrete graphics processing unit to the frame buffer 171 of the integral graphics processing unit 170 attached to the primary display 180. For example, the kernel mode wrapper driver, impersonating the operating system, may make a sequence of calls including: GetStandardAllocationDriverData to get the allocation bits to pass to the following calls, CreateAllocation to create an allocation, OpenAllocation to open it (specifying an offset into the heap, 0), AcquireSwizzlingRange to request a CPU mapping to the allocation, CommitVidPn to assign the allocation to scanout, SetVidPnSourceAddress to point the digital-to-analog converter (DAC) to the allocated surface, and SetVidPnSourceVisibility to turn on the primary display. The sequence of calls works because the operating system is not handling the integral graphics processing unit 170 attached to the primary display 180 at the time.

Thereafter, when the application 110 makes graphics request to the user mode level runtime API (e.g., DirectX API d3d9.dll) 120 of the operating system, the runtime 120 sends graphics requests to the DDI 130 which configures command buffers. The DDI calls to the operating system kernel mode driver (e.g., DirectX driver dxgkrnl.sys) 150, through the runtime API 120, to schedule the graphics request. The operating system kernel mode driver 150 then calls to the device kernel mode driver agent 160. The device kernel mode driver agent 160 determines a context of one or more calls after the transition call. The wrapper driver redirects the calls to the device specific kernel mode driver 162 of the integral graphics processing unit 170 attached to the primary display 180 and/or the device specific kernel mode driver 164 of the discrete graphics processing unit 175 based upon the context of the given call.

When a call to display a surface rendered by the discrete graphics processing unit 175 is received, the device kernel mode driver agent 160 inserts a call to the kernel mode driver 164 of the discrete graphics processing unit 175 to copy the rendered image to the physical address of the frame buffer 171 of the integral graphics processing unit 170. In one implementation, the rendered image is copied from a scanout of the discrete graphics processing unit 175 to the surface in the frame buffer 171 of the integral graphics processing unit 170. For example, a physical PCIe address can be deduced from the virtual address obtained from the AcquireSwizzlingRange call, and used for the discrete graphics processing unit 175 to emit direct memory access (DMA) blits into the specified range. The device kernel mode driver agent 160 also inserts a call to the kernel mode driver 162 of the integral graphics processing unit 170 to present the rendered image from the frame buffer on the display 180. The rendered image may be presented from the frame buffer by a digital-to-analog converter of integral graphics processing unit 170.

In one implementation, the scanout buffer of the discrete graphics processing unit 175 and/or the frame buffer for the integral graphics processing unit 170 may be double buffered. In one implementation, the rendered image is copied through a Peripheral Component Interconnect Express (PCIe) bus coupling the discrete graphics processing unit 175 to the integral graphics processing unit 170.

Accordingly, embodiments of the present technology advantageously enable applications to render graphics on the discrete graphics processor 175 and present the rendered graphics on a display 180 attached to the integral graphics processor 170. The integrated graphics processing unit is configured by a device kernel mode driver agent as a dumb buffer. The embodiments advantageously remove the need for multiplexers to transport the rendered images from the scanout of the discrete graphics processing unit to the display device attached to the integrated graphics processing unit.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. One or more non-transitory computing device readable media having computing device executable instructions which when executed perform a method comprising:
 detecting, by a device kernel mode driver agent, a transition from rendering graphics on a first graphics processing unit to a second graphics processing unit;
 configuring, through the device kernel mode driver agent, the first graphics processing unit to create a frame buffer and to scan out to a display from the frame buffer, in response to detecting the transition, wherein configuring the first graphics processing unit to create the frame buffer includes:
  redirecting a call to allocate a surface from a kernel mode driver of the second graphics processing unit to a kernel mode driver of the first graphics processing unit;
  allocating, by the first graphics processing unit, the frame buffer for a surface of a specified resolution in response to the redirected call to allocate the surface;
  returning, from the first graphics processing unit to the device kernel mode driver anent, a virtual address of the frame buffer;
  determining, by the device kernel mode driver agent, a physical address of the frame buffer from the virtual address returned from the first graphics processing unit; and
  storing, by the device kernel mode driver agent, the physical address of the frame buffer; and
 blitting an image rendered on the second graphics processing unit to the frame buffer of the first graphics processing unit after detecting the transition.

2. The one or more non-transitory computing device readable media having computing device executable instructions which when executed perform the method of claim 1, wherein the transition is initiated by a service or user interface calling a given entry point of a local function in the device kernel mode driver agent.

3. The one or more non-transitory computing device readable media having computing device executable instructions which when executed perform the method of claim 1, wherein the device kernel mode driver agent includes the device specific kernel mode driver of the first graphics processing unit and the device specific kernel mode driver of the second graphics processing unit.

4. The one or more non-transitory computing device readable media having computing device executable instructions which when executed perform the method of claim 1, wherein the device kernel mode driver agent includes components of the device specific kernel mode driver of the first graphics processing unit and the device specific kernel mode driver of the second graphics processing unit.

5. The one or more non-transitory computing device readable media having computing device executable instructions which when executed perform the method of claim 1, wherein blitting the rendered image comprises:
 receiving, by the device kernel mode driver agent, a call to the device specific kernel mode driver of the second graphics processing unit to display the rendered surface;
 inserting, by the device kernel mode driver agent, a call to the device specific kernel mode driver of the second graphics processing unit to copy the rendered image to the physical address of the frame buffer of the first graphics processing unit; and
 inserting, by the device kernel mode driver agent, a call to the device specific kernel mode driver of the first graphics processing unit to present the rendered image from the frame buffer, by a digital-to-analog converter of first graphics processing unit, on the display.

6. The one or more non-transitory computing device readable media having computing device executable instructions which when executed perform the method of claim 5, wherein copying the rendered image to the physical address of the frame buffer of the first graphics processing unit comprises a direct memory access (DMA).

7. The one or more non-transitory computing device readable media having computing device executable instructions which when executed perform the method of claim 1, wherein the first graphics processing unit comprises an integrated graphics processing unit.

8. The one or more non-transitory computing device readable media having computing device executable instructions which when executed perform the method of claim 1, wherein the second graphics processing unit comprises a discrete graphics processing unit.

9. The one or more non-transitory computing device readable media having computing device executable instructions which when executed perform the method of claim 1, wherein the device kernel mode driver agent comprises a wrapper driver.

10. A method comprising:

loading a kernel mode wrapper driver that includes a kernel mode device driver for a first graphics processing unit attached to a primary display and a kernel mode device driver for a second graphics processing unit on an unattached adapter;

receiving, by the kernel mode wrapper driver, a call from a service or user interface to transition from rendering graphics on the first graphics processing unit to the second graphics processing unit;

outputting, by the kernel mode wrapper driver, a call to create a surface in a frame buffer for the first graphics processing unit in response to the received call to transition from rendering graphics on the first graphics processing unit to the second graphics processing unit;

receiving, by the kernel mode wrapper driver, a virtual address of the surface in the frame buffer for the first graphics processing unit in response to the call to create the surface;

determining, by the kernel mode wrapper driver, a physical address of the surface from the virtual address of the surface;

storing, by the kernel mode wrapper driver, the physical address of the surface;

determining, by the kernel mode wrapper driver, a context of one or more calls after the transition call;

receiving, by the kernel mode wrapper driver, one or more calls having a rendering context after the transition call;

directing, by the kernel mode wrapper driver, the one or more calls having the rendering context to the kernel mode driver of the second graphics processing unit after the transition call;

receiving, by the kernel mode wrapper driver, one or more calls having a display context after the transition call; and redirecting, by the kernel mode wrapper driver, the one or more calls having the display context after the transition call including:

receiving, by the kernel mode wrapper driver, a call to present an image rendered on the second graphics processing unit;

inserting, by the kernel mode wrapper driver, a call to copy the rendered image to the surface in the frame buffer for the first graphics processing unit at the physical address stored by the kernel mode wrapper driver; and redirecting, by the kernel mode wrapper driver, a call to present the image from the surface in the frame buffer for the first graphics processing in response to the call to present the image rendered on the second graphics processing unit.

11. The method according to claim 10, wherein the call to copy the rendered image comprises a direct memory access to the physical address.

12. The method according to claim 10, wherein the rendered image is copied from a scanout of the second graphics processing unit to the surface in the frame buffer for the first graphics processing unit at the physical address.

13. The method according to claim 10, wherein the frame buffer is shared with the first and second graphics processing unit.

14. The method according to claim 10, wherein the rendered image is copied through a Peripheral Component Interconnect Express (PCIe) bus coupling the second graphics processing unit to the first graphics processing unit.

15. The method according to claim 10, wherein the frame buffer is shared with the first and second graphics processing unit and is mapped to a Peripheral Component Interconnect Express (PCIe) bus coupling the second graphics processing unit to the first graphics processing unit.

16. The method according to claim 10, wherein the frame buffer is double buffered.

* * * * *